United States Patent
Fez et al.

(10) Patent No.: US 7,333,727 B2
(45) Date of Patent: Feb. 19, 2008

(54) RECONFIGURABLE, MULTI-USER COMMUNICATIONS NETWORK, WITH LOW LATENCY TIME

(75) Inventors: Mathias Fez, Paris (FR); Gaëlle Barbary, Chatillon (FR)

(73) Assignee: Thales, Paris (FR)

( * ) Notice: Subject to any disclaimer, the term of this patent is extended or adjusted under 35 U.S.C. 154(b) by 678 days.

(21) Appl. No.: 10/206,298

(22) Filed: Jul. 26, 2002

(65) Prior Publication Data

US 2003/0063346 A1    Apr. 3, 2003

(30) Foreign Application Priority Data

Jul. 27, 2001    (FR) ................................. 01 10122

(51) Int. Cl.
*H04J 4/00* (2006.01)
*H04J 14/00* (2006.01)

(52) U.S. Cl. ........................................ 398/78; 398/58

(58) Field of Classification Search .................. 398/78, 398/77, 58, 118–131, 154; 375/130
See application file for complete search history.

(56) References Cited

U.S. PATENT DOCUMENTS

| | | | |
|---|---|---|---|
| 4,703,474 A | | 10/1987 | Foschini et al. |
| 4,779,266 A | * | 10/1988 | Chung et al. ................ 370/441 |
| 5,307,194 A | * | 4/1994 | Hatton et al. ................ 398/130 |
| 5,559,829 A | * | 9/1996 | Le Strat et al. ............. 375/141 |
| 5,608,723 A | * | 3/1997 | Felsenstein .................. 370/335 |
| 5,673,130 A | * | 9/1997 | Sundstrom et al. .......... 398/154 |
| 6,348,682 B1 | * | 2/2002 | Lee .......................... 250/214 A |
| 6,594,680 B1 | * | 7/2003 | Gu et al. ..................... 708/256 |
| 6,922,431 B1 | * | 7/2005 | Weber et al. ................ 375/130 |
| 2003/0011850 A1 | * | 1/2003 | Sidorovich et al. .......... 359/172 |

FOREIGN PATENT DOCUMENTS

WO    WO 99/07087    2/1999
WO    WO 99/33212    7/1999

* cited by examiner

*Primary Examiner*—Jason Chan
*Assistant Examiner*—Quan-Zhen Wang
(74) *Attorney, Agent, or Firm*—Oblon, Spivak, McClelland, Maier & Neustadt, P.C.

(57) ABSTRACT

The invention concerns a reconfigurable, multi-user optical communications network, with low latency time.

It comprises at least one transmitter generating from a digital data signal a brightness-modulated light signal, encoded with a pseudo-random code generated from a predetermined software key, optical means to transport said light signals(s) to at least one receiver associated with a user.

Each receiver comprises direct optical detection means generating an analog electrical signal characteristic of the sum of the encoded light signals transmitted, a pseudo-random code generator identical to that of the transmitters and means to decode said analog signal using a code transmitted by said code generator with a key identical to that associated with the transmitter with which the user wants to communicate, in order to recreate the data signal intended for the user.

14 Claims, 6 Drawing Sheets

RECONFIGURABLE, MULTI-USER COMMUNICATIONS NETWORK, WITH LOW LATENCY TIME

FIELD OF THE INVENTION

The invention concerns a reconfigurable, multi-user optical communications network, with low latency time, and applies more especially to datacom (data communications) applications for short distance data communications involving a small number of users.

BACKGROUND OF THE INVENTION

There is a vast scope for this type of network; it extends from the medical field, which has a high number of interconnections, to the aerospace field where the need for reconfiguration is of paramount importance. These networks also have numerous applications in the field of computers where the network reconfiguration times are a limiting factor as well as in the distribution of data in the radar antennas. Other examples of applications will be described below.

The use of light to convey information has become more widespread since it can be used to carry a considerable amount of information. The need for reconfigurable networks makes the choice of switching element critical. In the known state of the art, reconfiguration is carried out by various means. For example, the optical switch, positioned on the optical fiber network and based on the switching of optical beams guided in the fibers either by liquid crystals or by mechanical movement of optical fibers. However, the high reconfiguration time (from several hundred microseconds to several milliseconds) makes this system unsuitable for datacom applications. In addition, one optical fiber is required for each transmitter. The use of an electrical switch upstream from the transmitters makes reconfiguration faster but one transmitter is required for each reconfiguration combination, and there again, the network is multifiber.

FIGS. 1A and 1B describe two networks of the prior art in which the light beams can be carried by a single optical fiber. The first example (FIG. 1A) describes an optical time division multiple access (OTDM) multiplexer. The network comprises a set of transmitters $EM_i$ and receivers $RE_j$. In the remainder of the description, the index "i" refers to transmission and the index "j" refers to reception. In this example, the indices i and j take values from 1 to 4. Each transmitter comprises electrical/optical conversion means EO and an optical switch OS. When the switch is closed, a brightness-modulated light signal is output from a digital data signal $DATA_i$ and transported by optical transport means, in this example an optical fiber FO, to receivers $RE_j$, themselves formed from an optical switch OS and optical/electrical conversion means OE. Each receiver is associated with a user $USER_j$. Reconfiguration is carried out by time management of the switches. However, the disadvantage of this simple, low-cost system is that the users are allocated a reduced useful passband, because of the time division. Moreover, perfect synchronization is required between transmitters and receivers.

FIG. 1B illustrates a WDM (Wavelength Division Multiplexing) type network for which the reconfiguration is carried out in wavelengths. The wavelength multiplexing technology consists of injecting into the same optical is fiber FO several optical signals (or channels) with the same modulation frequency but with different wavelengths ($\lambda_i$). Reconfiguration is then carried out by choosing the color corresponding to the required path. This technology can therefore be used to carry a large number of signals at the same time. However, it requires the use of special transmitters and receivers, marked respectively $EM_i$ and $RE_j$ on FIG. 1B, which have all colors, for example by using tunable laser sources for the transmitters and tunable filters for the receivers, as well as special components for the multiplexing. Consequently, the system is too expensive for datacom applications.

SUMMARY OF THE INVENTION

The proposed invention consists of reconfigurable, multi-user optical communications network, with low latency time based on the use of modulation of the optical power of a emission source, for example a multimode laser, and in which several signals can be transmitted simultaneously on the same transmission support with the same wavelength, thereby reducing the manufacturing cost.

More precisely, the invention concerns a reconfigurable, multi-user optical communications network, with low latency time, including at least one transmitter generating from a digital data signal a brightness-modulated light signal, optical means to transport the light signals(s) to at least one receiver associated with a user and reproducing from the light signal transmitted the data signal intended for said user, wherein:

each transmitter comprises a pseudo-random code generator transmitting a code generated from a predetermined software key, means to encode the data signal with said code to form an encoded digital signal, light emission means comprising a multimode light source whose optical power is directly modulated by the encoded digital signal to generate a corresponding encoded light signal, and each receiver comprises direct optical detection means generating an analog electrical signal characteristic of the sum of the encoded light signals transmitted, a pseudo-random code generator identical to that of the transmitter(s) and means to decode said analog signal using a code transmitted by said code generator with a key identical to that associated with the transmitter with which the user wants to communicate, in order to recreate the data signal intended for the user.

The electrical reconfiguration by code with brightness modulation of the light signal (and not by its phase) combines the advantages of high speed and extreme ease of use.

BRIEF DESCRIPTION OF THE DRAWINGS

Other advantages and features will be clearer on reading the following description, illustrated by the attached figures representing in.

DESCRIPTION OF THE PREFERRED EMBODIMENT

Figure 1A:
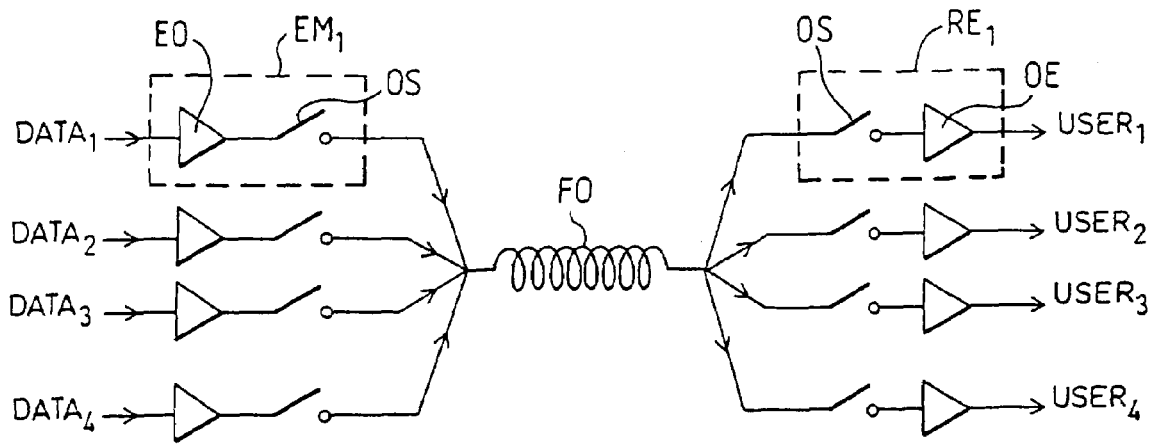
FIGS. 1A and 1B, block diagrams of optical communications networks according to the prior art (already described)
Figure 1B:
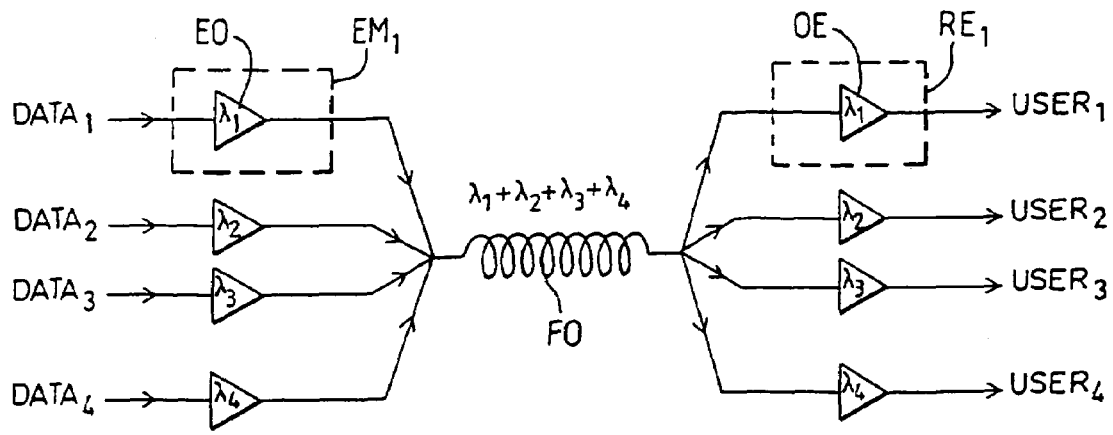
Figure 2:
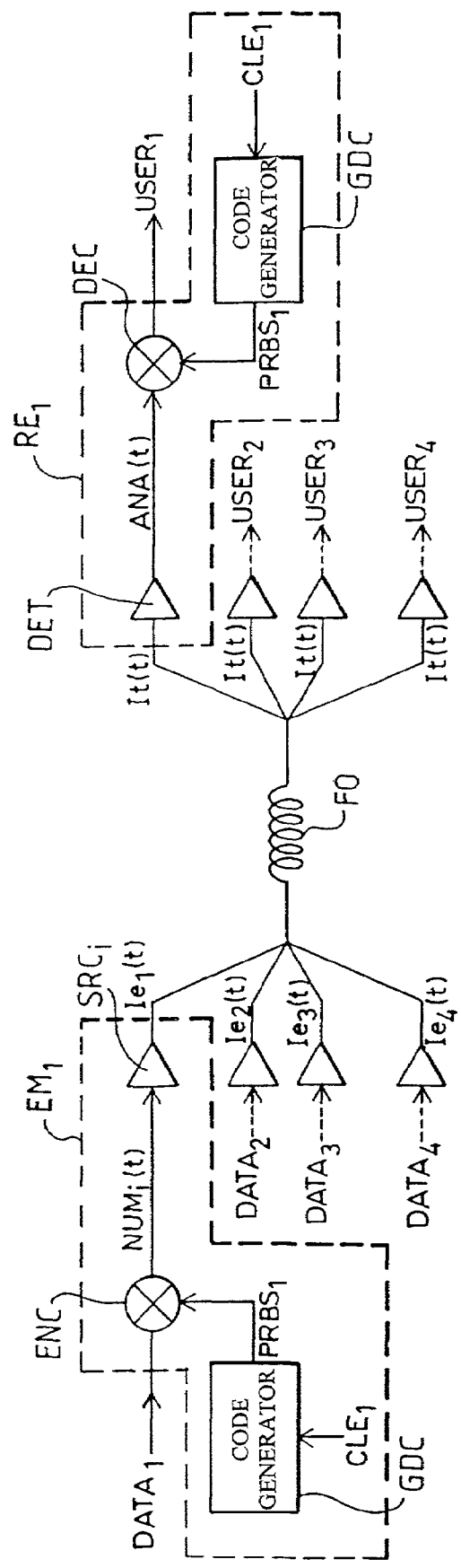
FIG. 2, a block diagram of a network according to the invention.

FIG. 2 describes the block diagram of the optical communications network according to the invention;

It comprises at least one transmitter $EM_i$ generating from a digital data signal $DATA_i$ a brightness-modulated light signal, optical means to transport said light signals(s) to at least one receiver $RE_j$ associated with a user $USER_j$ and recreating from the light signal transmitted the data signal intended for said user. In the example of FIG. 2, the network comprises 4 transmitters and 4 receivers, index "i" referring to transmission can take values from 1 to 4 and index "j" referring to reception can also take values from 1 to 4. For clarity purposes, only transmitters and receivers $EM_1$ and $RE_1$ have been shown. According to the invention, each transmitter comprises a pseudo-random code generator GDC transmitting a code $PRBS_i$ generated from a predetermined software key $CLE_i$, means ENC to encode the data signal $DATA_i$ with the code to form an encoded digital signal $NUM_i(t)$, light emission means $SRC_i$ producing from the encoded signal $NUM_i(t)$ a corresponding encoded light signal $Ie_i(t)$, the transmission means of two separate transmitters being incoherent in phase such that the encoded light signals transmitted do not interfere and such that the total brightness of the signal transmitted is the sum of the brightnesses of each of the encoded signals transmitted. Each receiver $RE_j$ includes means for direct optical detection DET of the encoded light signal $I_r(t)$ transmitted which produce an analog electrical signal $ANA(t)$ characteristic of the sum of said light signals $Ie_i(t)$. It also comprises a pseudo-random code generator GDC identical to that of the transmitters and means DEC to decode said analog signal using a code $PRBS_i$ transmitted by said code generator with a key $CLE_i$ corresponding to the key associated with the transmitter $EM_i$ with which the user $USER_j$ wants to communicate, in order to recreate the data signal $DATA_i$ intended for the user.

Depending on the applications, the key may be specific to the transmitter, reconfiguration of the network being carried out with the decoding means DEC of the receivers by choosing the decoding key corresponding to the key specific to each transmitter with which the user wants to communicate, or the key may be specific to the receiver, reconfiguration of the network being carried out with the decoding means ENC of the transmitter(s).

Figure 9:
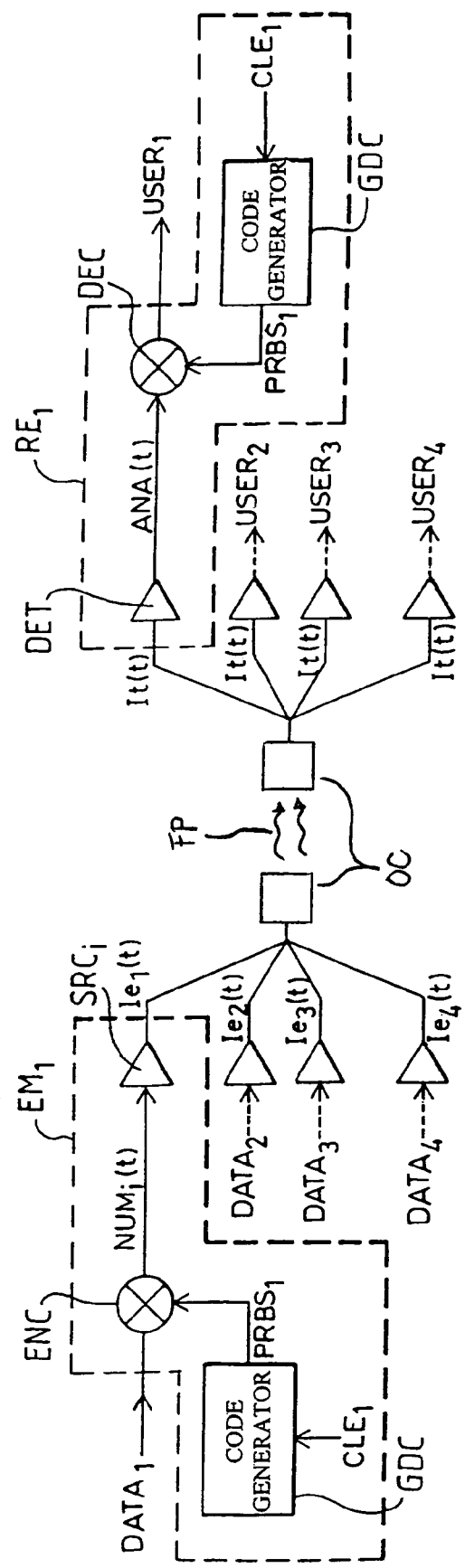
FIG. 9 shows a block diagram of the invention similar to the one of FIG. 2 with a signal propagation in the air.

Thus, a different key $CLE_i$ is allocated for example to each transmitter $EM_i$, this key being used to produce a pseudo-random code which will be combined with the digital data $DATA_i$ of the transmitter to form the signal to be transmitted $Ie_i(t)$. This signal is sent on the light emission means $SRC_i$ which may be produced using commercially available components. All the emission means of all transmitters may be identical since they use the same wavelength. They comprise for example a multimode light source, for example a laser diode, whose optical power is modulated according to the encoded digital signal $NUM_i(t)$. The encoded light signals are for example combined using an optical coupler (not shown on FIG. 2) in a single multimode fiber FO. They may also be combined by using an optical coupler OC and then propagate in the air, in free propagation FP, as shown in FIG. 9.

The device GDC to generate the pseudo-random sequence and modulate it by the data to be transmitted can be implemented in a programmable digital component (such as a FPGA, CPLD, etc.). It would also be possible to design an ASIC (Application Specific Integrated Circuit) containing these various functions (analog and digital) in order to include this feature in the optical interconnection module and improve the performance.

On reception, the reverse process is carried out: an optical coupler connected on the optical fiber FO is used for example to send the light data flow $l_r(t)$ transmitted on the detection means DET of all receivers $RE_j$. Since the encoded data is transmitted by brightness modulation of the light signal and not by phase modulation, detection is direct, using for example a photodiode, identical for all the receivers. By sending to the receiver the key corresponding to that of the transmitter with which communication is to be set up, the same pseudo-random code $PRBS_i$ as that of the transmitter is regenerated locally in the receiver. The combination of this local code with the signal output from the optical/electrical converter formed by the direct detection means DET can be used to retrieve the data from the transmitter correctly. The device combining the local code and the data received must be an analog component which can perform the multiplication and filtering functions essential to the retrieval of decoded data.

We will now describe in more detail the characteristics of the codes used, how to generate them and the constraints they impose on the system. We will then detail the transmitter and receiver modules, emphasizing their features specific to the network according to the invention.

The codes used in the reconfigurable network according to the invention are pseudo random binary sequences or codes (PRBS), consisting of bit sequences generated by a polynomial degree n whose initial state with n bits forms the key. Certain sequences, also called spreading sequences have special intercorrelation and self-correlation properties which can be used in particular to distinguish between the various users. In practice, they can be generated in a known manner, for example with shift registers.

It is important to note that we are interested in the properties of the polynomials used, in other words any sequence with the correct properties is suitable and these sequences can all be generated using the same principle. For example, M-sequences, Gold and Kasami sequences can be used. These sequences are described for example in "Error Code Correction" (J. Wiley Editor) or "Digital Communications" by J. Proakis (McGraw Hill Editor).

The principle of the encoding used in the network according to the invention is based on sequences whose two main properties are, firstly, the orthogonality of the sequences to each other, so that it is possible to retrieve the data specific to each user from amongst the data of all users. The intercorrelation function of two orthogonal sequences is in fact close to zero, with the noise depending on the performance of the codes used. Secondly, the self-correlation peak of a sequence, which can be used to synchronize transmitter and receiver if the propagation times are not .fixed or if the receiver clock is not in synchronization with the transmitter clock.

Figure 3:
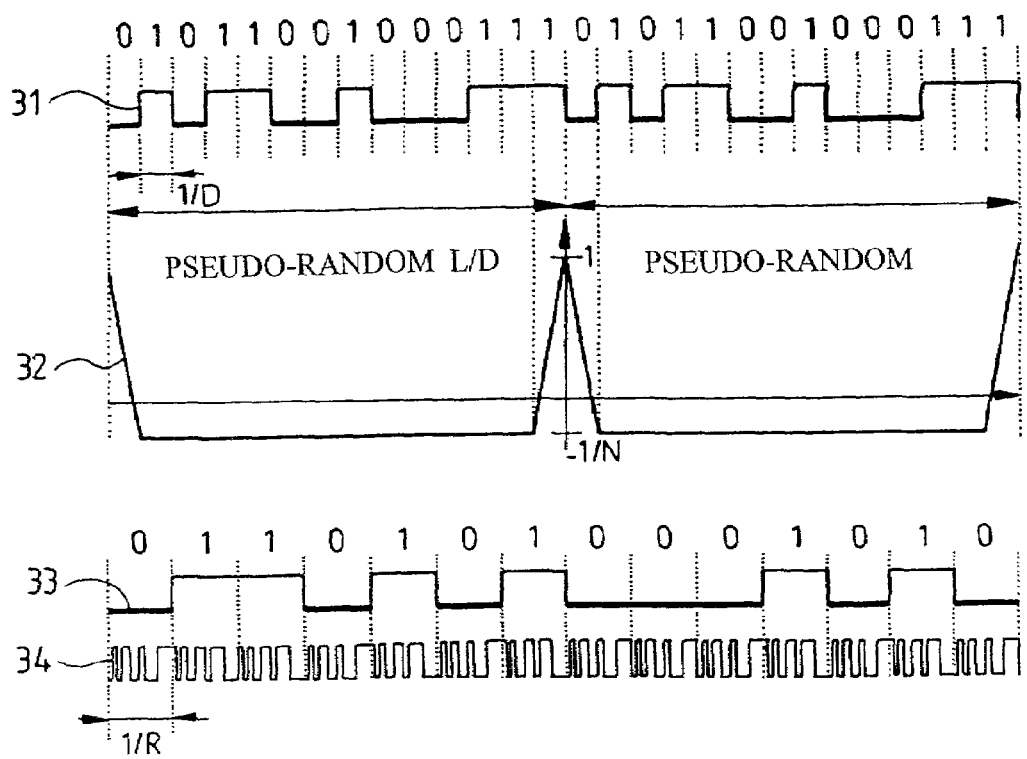
FIG. 3, graphs illustrating through examples a pseudo-random code, its self-correlation function and the encoding of the data to be transmitted.

FIG. 3, gives an example of a pseudo-random code, its self-correlation function and an example of encoding of the data to be transmitted. Graph 31 shows a pseudo-random binary sequence PRBS of type M-Sequence, of degree n equal to 4, i.e. whose length L (or number of states) is $2^n-1$, i.e. 15 in this example. D refers to the speed of the sequence PRBS. The pseudo period is defined by the ratio L/D. As shown on FIG. 3, the self-correlation of the M-Sequence shown on graph 32 has a correlation peak equal to 1. Similarly, the intercorrelation function of a maximum M-sequence with the sum of all the other M-sequences (including the sequence itself) has a detectable correlation peak in spite of the noise due to the other M-sequences. It will therefore be possible to use the peak to synchronize each receiver, each one using its own key, in spite of the noise due to the other users. On FIG. 3, graph 33 gives an example of a digital data signal to be transmitted, of speed R. Graph 34 illustrates the encoding of the data signal 33 with the M-Sequence 31.

One of the most interesting properties of the network according to the invention lies in its modularity. It is in fact possible, as illustrated below, to privilege the number of users or the speed allocated to each user, whilst keeping the same structure. To do this, the code family, and more precisely the degree of the generating polynomials to be used, are chosen according to the number of users required.

For example, for M-sequences, a degree n can be used to generate codes of length $L=2^n-1$, and the number of users possible $N_p(n)$ is given by the following relation:

$$N_p(n) = \frac{2^n - 1}{n} \prod_{i=1}^{k} \frac{P_i - 1}{P_i} \quad (1)$$

Where $P_i$ for i=1, 2, . . . k is the decomposition into prime numbers of $2^n-1$. Thus, for n=6, the length of the sequence is $L=2^n-1=63$ and the number of users possible is, according to equation (1), $N_p(6)=6$. By using M-sequences of degree 6 therefore, 6 users can be connected with codes of length 63.

For the Gold codes, a degree n gives $2^n+1$ users and codes of length $2^n-1$. This is valid if two polynomials of length n are summed or if the polynomial produced of length 2n is used. Comparison shows that the Gold codes give more users for codes of the same length.

An example is given below of a generator of Gold codes of degree n=6. The preferential pair below of degree n=6, to generate a family of 65 codes of length 63, can be used:

$f(x)=1+x+x^6$ $g(x)=1+x+x^2+x^5+x^6$

The polynomial produced is given by f(x)g(x). The corresponding shift register can generate 65 different sequences of period 63. The intercorrelation of any pair of sequences ha excellent properties, which means that Gold codes produce very interesting sequences.

Figure 4A:
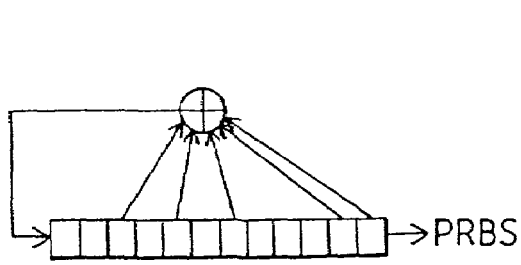
FIGS. 4A and 4B, the execution of Gold sequences respectively by a single shift register or by a double shift register.
Figure 4B:
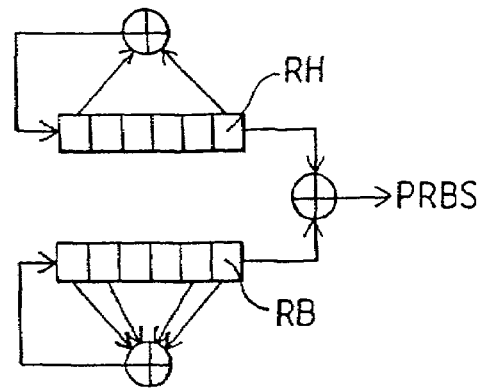

FIGS. 4A and 4B illustrate the creation according to the above example of Gold sequences with respectively a single shift register (and degree n=12) and a double shift register (n=6), with a high register RH and a low register RB. These figures demonstrate how easy it is to generate pseudo-random codes. In this case we generate, in fact, a family of 65 codes, with two polynomials of degree 6 or one only of degree 12. Each code is obtained by changing the initial state of the various registers; for FIG. 4B, only the initial state of the high register RH is modified in order to generate the sequences specific to each user. Referring to FIG. 2 again, the code generator GDC therefore corresponds to the registers and the key $CLE_i$ to the initial state of the register.

An important parameter to be taken into account in the quality and in the transmission capacity of the network according to the invention is the spreading factor F=D/R (ratio between the code speed D and the data signal speed R). For a minimum value of F (equal to the length of the PRBS), a whole period of the sequence is contained in one bit, which guarantees the above-mentioned inter- and self-correlation properties. If F is less than this value, however, the properties described are affected. The self-correlation peak will, in fact, drop and the average intercorrelation value increase. Consequently, there is theoretically an $F_{min}$ which guarantees a certain transmission quality. A maximum speed is therefore set for the users, which depends on the speed of the sequence.

The properties of the pseudo-random codes used enable a large amount of data, from numerous transmitters, to be transmitted. For example, with a large spreading ratio (>1000) and lengths of M-sequences equal to 10, the maximum number of users is 60 (see equation (1)). If Gold codes of degree 6 are used, 65 users can then be connected with a spreading factor F of about 60. The useful speed of the data signals $DATA_i$ is then significantly increased for an equivalent number of users.

It is the maximum speed at which the spreading sequence limiting the system can be generated, more precisely the useful speed of the users, and according to the minimum spreading ratio. The usual laser power modulation frequencies are approximately 2 to 2.5 GHz and a spreading ratio of 1,000 will therefore provide a user speed of 2 to 2.5 MHz, whereas a spreading ratio of 60 will lead to a useful speed of 30 to 40 MHz.

The following table shows the capacities of the network according to the invention for various sequences used. It includes, for a given degree n, the number of users $N_p(n)$ and the average useful speed per user. Other parameters may modify the results, but this table gives an overview of the network possibilities. The speeds are calculated by considering that the speed D of the spreading sequence=2 GHz.

TABLE 1 capacities of the network according to the invention

| Key type | Sequence degree (n) | Number of users | Useful speed (Mbits) |
|---|---|---|---|
| M-sequence | 6 | 6 | 31 |
| M-sequence | 10 | 60 | 2 |
| Gold | 2 | 5 | 666 |
| Gold | 6 | 65 | 31 |
| Gold | 7 | 129 | 16 |

This table shows that the sequence type has a considerable effect on the system capacity and offers numerous possibilities, network reconfiguration depending on the sequence type being very easy to carry out. The number of users can therefore vary and the speeds of the users can occasionally be high since some users on the network can be temporarily reduced or deleted.

Another important parameter of the network according to the invention is the latency time or reconfiguration time.

The network can be reconfigured since the transmitter (respectively the receiver) knows the key of the receiver (respectively the transmitter) it wants to communicate with. The network reconfiguration time may therefore be fixed or variable.

If the propagation delays are fixed, they can be determined in advance and compensated in the receivers. The latency time for a reconfiguration therefore depends only on the time required to load the keys in the generators, this time is fixed and depends on the system structure.

If the propagation delays are variable (the distance between the points connected is variable), the transmitter and receiver PRBS sequences must be synchronized. Synchronization can be carried out by retrieving the clock signal (with suitable encoding) and by detecting the correlation peak between the encoded signal received by the decoder and the signal regenerated locally. The reconfiguration time T therefore depends only on the spreading ratio.

The synchronization has a maximum duration T equal to the length of the pseudo-random code L divided by its speed (T=L/D), i.e. the pseudo-period of the code (FIG. 3). For an optimum spreading ratio therefore (equal to the length of the PRBS), a maximum of one data bit will be lost. For a Gold code of degree 2 and length 3, the ratio between the clock period $T_{CLK}$ of the PRBS and that of the data is equal to 3 and the maximum latency time is equal to $3 \times T_{CLK}$.

The greater the spreading ratio at constant data speed, the lower the synchronization time with respect to the speed of the data bits. If the spreading factor F remains greater than the length of the spreading sequence, then the synchronization time remains less than the duration of a data bit and no data is lost. The relation between the reconfiguration time T and the spreading ratio F is:

$$T = \frac{(2^n - 1)^2}{F} \times T_{CLK} \quad (2)$$

Synchronization therefore takes longer if the distances are variable but it can be reduced by increasing the spreading ratio, at the detriment of the user speed. It is virtually instantaneous if the distances are fixed.

We will now describe the transmitters and receivers, emphasizing their features specific to the network according to the invention.

It is important to note at this stage that all the transmitters, and all the receivers, can be virtually identical since the transmitters can all work at the same wavelength as long as the light emission means of the transmitters are incoherent in phase. The only difference between two transmitters or two receivers is the key used to generate the code. This difference is therefore purely at software level.

Figure 5:
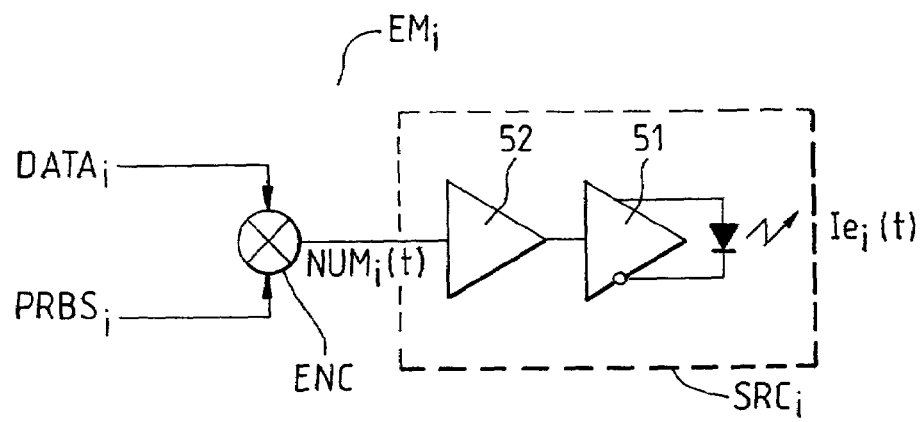
FIG. 5, a block diagram of a transmitter in a network according to the invention.

FIG. 5 represents a simplified diagram of a transmitter $EM_i$ according to the invention. Concerning the transmission, the light emission means $SRC_i$ consist for example of a commercially available optoelectronic module which can be used without modification to generate the optical signal. For example, it could be a laser diode, a light emitting diode, or more generally a multimode light emission source with a driver stage 51 and a buffer stage 52. The emission sources of the various transmitters must be incoherent between each other so that there is no interference between the encoded light signals transmitted by the various transmitters and so that their brightnesses can be summed to form the light signal $l_r(t)$ (FIG. 2). A feature of the transmitter is the electrical signal $NUM_i(t)$ in input of the optoelectronic module. As explained previously, this signal consists of spread data, i.e. the spreading sequence $PRBS_i$ generated by a code generator (not shown on FIG. 5), modulated by the digital data signal $DATA_i$, using the encoding means or encoder ENC. Modulation consists of simple multiplication which can be carried out by an XOR gate digitally. The encoding (spreading) phase is easy to carry out digitally, as shown in the example on FIG. 3.

Note that FIG. 5 represents a simplified diagram which does not show, for example, the part concerning the adaptation of the sequence clocks and of the data according to the spreading ratio.

Figure 6:
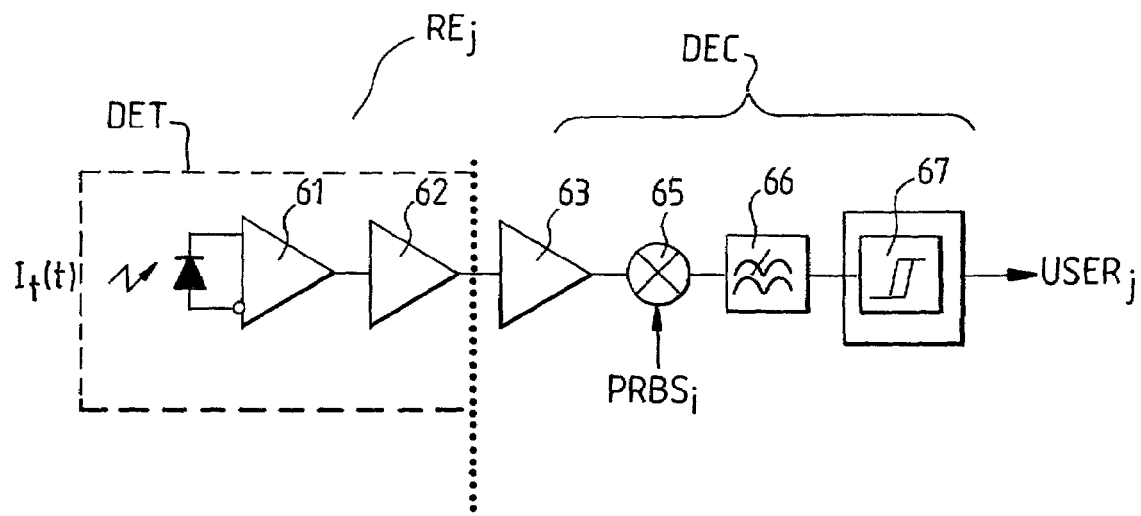
FIG. 6, the block diagram of a receiver in a network according to the invention.

FIG. 6 represents a simplified diagram of a receiver $RE_j$ according to the invention. Reception is more difficult and involves special steps. It must be possible to process the optical signal received $l_r(t)$ which includes several power levels since it represents the sum of the encoded optical signals transmitted by the various transmitters and transported by the optical transport means. The quality of the signal received and demodulated depends on several parameters, in particular the sensitivity of the detection means DET of the receiver and the noise due to the reception chain. Apart from the detection means DET, the receiver according to the invention comprises means DEC to decode or "unspread" the analog signal produced by the detection means DET using a key corresponding to the key associated with the transmitter with which the user wants to communicate, in order to recreate the data signal intended for the user. In the example of FIG. 6, a decision unit 67, consisting for example of a thresholding stage, is used to recreate the data signal in digital format.

The detection means DET comprise for example a photodiode associated with a transimpedance amplification stage 61 and an amplification stage 62. The received signal output from the coupler (not shown on FIG. 6) has very low power (it depends on the number of coupled channels) and the photodiode must therefore be sufficiently sensitive. The ratio between the maximum dynamic of the photodiode $D_{MAX}$ and the power supply noise $B_{alim}$ will determine the number of detectable levels and therefore the maximum number of users:

$$\frac{D_{MAX}}{B_{alim}} = N_{pmax} + 1 \quad (3)$$

where $N_{pmax}$ is the maximum number of users.

If the levels are less than the power supply noise, they will not be identified and the decision will be made on ranges including several levels. This will result in an increase in the error rate.

Figure 7:
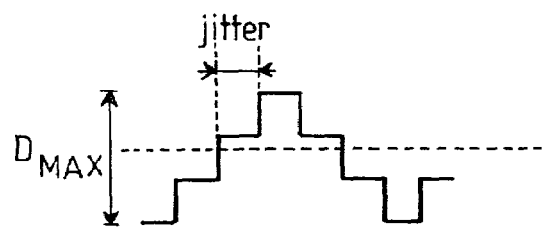
FIG. 7, the diagram of the signal received by the detection means according to an example.

FIG. 7 represents the diagram of the signal received by the photodiode according to an example. On this figure, the maximum dynamic is reached with three users. If, during the decision-making, detection occurs at the dotted line, the error probability is ⅓ on each user; one of them did not transmit but will be detected as having transmitted, and it is impossible to determine which one. This uncertainty on the fronts results in jitter, whose minimum value is equal to one clock period of the PRBS, i.e. $T_{CLK}$. On FIG. 7, the jitter equals $T_{CLK}$.

It is also possible to express the relation between the system performance and the signal to noise ratio of the photodiode with the following equation:

$$\frac{J_{av}}{S_{av}} = \frac{1}{N_p - 1} \text{ i.e. } N_p = \frac{J_{av}}{S_{av}} + 1 \quad (4)$$

Where $$\frac{J_{av}}{S_{av}}$$

is the ratio between the sum of the powers of the signals of the other users after decoding by the useful signal, and $N_p$ the number of users. This ratio can also be written:

$$10 \log\left(\frac{J_{av}}{S_{av}}\right) = 10 \log\left(\frac{D}{R}\right) - \left(\frac{E_b}{N_0}\right)_{TEB} \quad (5)$$

Where D/R is the spreading factor and $$\left(\frac{E_b}{N_0}\right)_{TEB}$$

the bit energy required for a given BER (bit error rate) and depends on the characteristics of the photodiode and of the transimpedance stage 61; we can use these two parameters to determine the appropriate receiver.

Consequently, the receiver $RE_j$ according to the invention does not correspond to a traditional reception module since an analog processing phase specific to the application is required; this is the decoding or unspreading phase DEC. In order to work on several levels in fact, it is essential to carry out the decoding before the decision unit 67. The applicant has in fact demonstrated that the signal can be processed on several levels but that the properties of the sequences are lost if the signal is put back on two levels, i.e. if only the extreme levels are taken into account (all transmitters at 1 or all transmitters at 0).

In the example of FIG. 6, the decoding means DEC comprise a gain stage 63, a decoder 65 and filtering means 66. The gain is a difficult part since the signal brightness is very low and it must be extracted from the noise. This step is used to format the signal output from the photodiode to adjust its brightness to that of the sequence used for unspreading; this is carried out in order to optimize the mathematical properties of the sequences. In this case, the decoder consists of an analog multiplier (signal on several levels) to which is applied in input the reformatted transmitted signal and the spreading sequence. The output from the multiplier supplies the unspread signal, i.e. the user data $USER_j$ which must be reformatted. A low-pass filter 66, which must be configured according to the user speed, then a decision unit 67, are used.

The principle of the optical communications network according to the invention has been validated by numerical simulation and using a test and feasibility model. A transmission chain for two users has been simulated. The results are displayed as eye diagrams (FIGS. 8A and 8B), which represent the superimposition of all the states taken by the signal during one clock period. The calculations were carried out with $D_{PRBS}$=10 Mbits and $D_{data}$=0.1 Mbits (FIG. 8A) then 0.3 Mbits (FIG. 8B), the sequences that we use are Gold codes of degree 6. The critical spreading factor is therefore equal to 63 and the two eye diagrams show results respectively for a spreading factor F less than $F_{min}$ (FIG. 8B) and an F greater than $F_{min}$ (FIG. 8A).

Figure 8A:
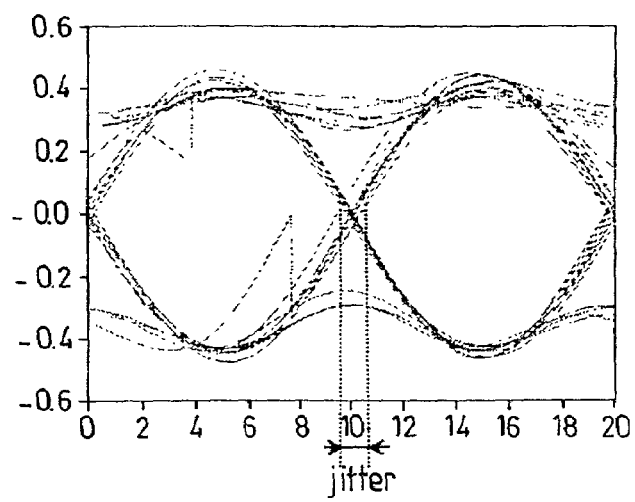
FIGS. 8A and 8B, the results as eye diagrams of a simulation of an example of network according to the invention for two users.
Figure 8B:
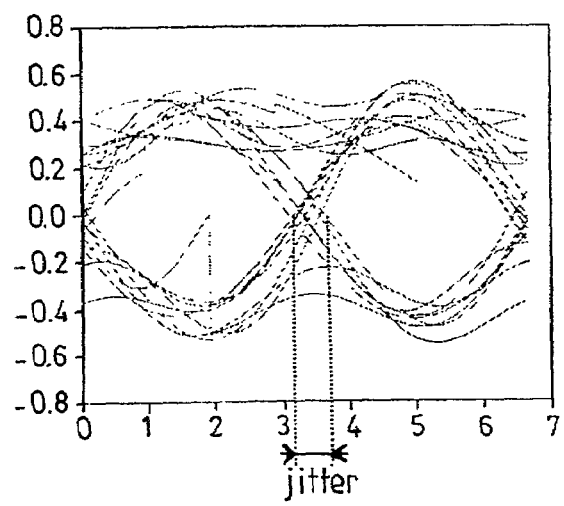

FIGS. 8A and 8B below illustrate the results obtained concerning data reception, the eye diagrams are open in reception but we observe jitter which may be modeled as instability of the fronts and which is increasingly present at high frequency.

To correct the jitter, an additional unit can therefore be provided in reception to recreate the signal at a determined rate; for example a clock retrieval system.

The results are nevertheless satisfactory and demonstrate that the data can be reproduced with a low error rate. The jitter is higher when the user speed does not respect the $F_{min}$ (FIG. 8A), but the data can be retrieved with a loss of performance, in spite of the above-mentioned limit.

These simulations demonstrated the reliability of the principle of the network according to the invention and its advantage in its optical form, as compared with the impossibility of producing the electrical system due to the phase beating phenomena between the electrical carriers.

The optical communications network so described opens a vast field of applications for reconfigurable optical networks. The network reconfiguration times are very low and the fact that all transmitters and receivers are identical reduces the manufacturing costs of this type of network. In addition, optical networks can be produced which are asynchronous (no need to synchronize the transmitters) and which are reconfigurable, the number of users being specified by software.

The system modularity is also very interesting; preference can be given to the number of users or the speed of the users, whilst retaining exactly the same structure. This device remains compatible with the use of the transmission support (optical fiber) for a very high speed link at the same wavelength.

The network according to the invention can therefore be applied according to a first example to a data distribution system with several transmitters and several receivers. More specifically, interesting applications can be found in radar antennas (the transmitters consist of signal processing modules and the receivers of antenna control modules), and in the medical field, for example in NMR (Nuclear Magnetic Resonance) systems, the transmitters then consist of sensors and the receivers of signal processing modules. In these types of network, the light emission means of each transmitter are preferably identical and comprise a multimode light source whose optical power is modulated according to the encoded digital signal. It could be for example a multimode laser diode or a light emitting diode. A specific software key $CLE_i$ is associated with each transmitter, network reconfiguration being carried out by the decoding means of the receivers $RE_j$ by selecting the key $CLE_i$ identical to the key specific to each transmitter $EM_i$ with which the user $USER_j$ wants to communicate.

According to another application example, the optical communications network according to the invention applies to a system for distribution of data between a single transmitter $EM_1$ and several receivers $RE_j$. This is the case for example in the passenger compartment of an airplane, an optical transmission system in free space between a program distribution terminal (the transmitter) and the receivers positioned on the airplane seats. This could also be a data transmission system in free space between a fixed communication terminal (the transmitter) and receivers positioned on trains. In these examples, a specific software key $CLE_j$ is associated with each receiver $RE_j$, network reconfiguration being carried out by the encoding means of the transmitter by selecting the key $CLE_j$ identical to the key specific to each receiver $RE_j$ whose associated user wants to communicate with the transmitter $EM_1$. In these examples, the propagation of the encoded light signal transmitted by the transmitter takes place by free propagation to the receivers, thereby creating a "wireless" communications network. The choice of transmission means depends on the application. For short distances, a laser diode could be used, in the near infrared for example. For longer distance applications, a flash lamp could be used, whose optical power is modulated according to the encoded digital signal.

We claim:

1. A reconfigurable, multi-user optical communications network, with low latency time, comprising:
   a first transmitter configured to generate a first brightness-modulated light signal from a first digital data signal,
   a second transmitter configured to generate a second brightness-modulated light signal from a second digital data signal
   optical means configured to combine and transport the first and second light signals to at least one receiver, wherein
   each of the first and second transmitters comprise,
   a pseudo-random code generator configured to transmit a code generated from a predetermined software key,
   means to encode the data signal with said code and configured to output an encoded digital signal,
   light emission means, comprising a multimode light source whose optical power is directly modulated by a signal consisting of the encoded digital signal to generate a corresponding encoded light signal, and wherein the at least one receiver comprises,
   direct optical detection means configured to generate an analog electrical signal characteristic of the sum of the combined first and second light signals transmitted,
   a pseudo-random code generator identical to the pseudo-random code generator of either the first and second transmitter, and
   means to decode said analog signal using a code transmitted by said code generator with a key identical to the predetermined software key associated with at least one of the first and second transmitters and configured to recreate the data signal intended for the user.

2. The optical communications network according to claim 1, wherein said multimode light source is a laser diode.

3. The optical communications network according to claim 1, wherein said direct optical detection means comprise a photodiode associated with a transimpedance amplification stage and an amplification stage.

4. The optical communications network according to one of claims 1 to 3, wherein the optical transport of the encoded light signal is carried out in free propagation.

5. The optical communications network according to claim 1, wherein the encoding means of each of the first and second transmitters comprise digital multiplication means between the data signal and the code generated using said key.

6. The optical communications network according to claim 1, wherein the decoding means of the at least one receiver comprises:
   first analog signal formatting means,
   analog multiplication means between said formatted analog signal and said code configured to obtain a decoded signal, and
   low-pass filtering means applied to the decoded signal configured to recreate at least one of the first and second data signals.

7. The optical communications network according to claim 6, wherein the decoding means further comprises:
   means for thresholding, after the filtering means, configured to recreate at least one of the first and second data signals in a digital format.

8. The optical communications network according to claim 1, wherein the codes generated by the pseudo-random code generators are Gold type codes.

9. The optical communications network according to claim 1, wherein the codes generated by the pseudo-random code generators are M-sequence type codes.

10. The optical communications network according to claim 1, applied to a data distribution system with several transmitters and several receivers, wherein the light emission means of each transmitter are virtually identical and comprise a multimode light source whose optical power is modulated according to the encoded digital signal, and wherein each transmitter is associated with a specific software key, network reconfiguration being carried out by the decoding means of the receivers by selecting the key identical to the key specific to each transmitter with which the user wants to communicate.

11. The optical communications network according to claim 1, applied to a system for distribution of data between at least one of the first transmitter and the second transmitters and several receivers, wherein each receiver is associated with a specific software key, network reconfiguration being carried out by the encoding means of the at least one of the first transmitter and the second transmitter by selecting the key identical to the key specific to each receiver whose associated user wants to communicate with the at least one of the first transmitter and the second transmitter.

12. The optical communications network according to claim 11, wherein the propagation of the encoded light signal transmitted by each of the first and second transmitters is carried out in free propagation to the receivers.

13. The optical communications network according to claim 12, wherein the light transmission means of each of the first and second transmitters comprise a flash lamp whose optical power is modulated according to the encoded light signal.

14. A reconfigurable, multi-user optical communications network, comprising:
   a first transmitter configured to generate first a brightness-modulated light signal from a first digital data signal,
   a second transmitter configured to generate a second brightness-modulated light signal from a second digital data signal,
   an optical coupler configured to combine and transport the first and second light signals to at least one receiver, wherein
   each of the first and second transmitters comprise,
   a first pseudo-random code generator configured to transmit a code generated from a predetermined software key,
   an encoder configured to encode the data signal with said code and configured to output an encoded digital signal,
   a light emitter, comprising a multimode light source whose optical power is directly modulated by a signal consisting of the encoded digital signal, to generate a corresponding encoded light signal, and wherein
   the at least one receiver comprises,
   an optical detector configured to generate an analog electrical signal characteristic of the sum of the first and second light signals transmitted,
   a second pseudo-random code generator, and
   a decoder configured to decode said analog signal by using a code transmitted by said first pseudo-random code generator with the predetermined software key of either the first or second transmitter and configured to recreate at least one of the first and second data signals.

* * * * *

UNITED STATES PATENT AND TRADEMARK OFFICE
CERTIFICATE OF CORRECTION

PATENT NO. : 7,333,727 B2
APPLICATION NO. : 10/206298
DATED : February 19, 2008
INVENTOR(S) : Mathias Pez et al.

It is certified that error appears in the above-identified patent and that said Letters Patent is hereby corrected as shown below:

On the title page, Items (12), (54) and (75), the title and inventors information, are incorrect. Item (12), (54) and (75) should read as follows:

-- (12) United States Patent
Pez et al. --

-- (54) RECONFIGURABLE, MULTI-USER OPTICAL COMMUNICATIONS NETWORK, WITH LOW LATENCY TIME --

-- (75) Inventors: Mathias Pez, Paris (FR); Gaëlle Barbary, Chatillon (FR) --

In column 1, the title is incorrect. The title should read:

-- RECONFIGURABLE, MULTI-USER OPTICAL COMMUNICATIONS NETWORK, WITH LOW LATENCY TIME --

Signed and Sealed this

Tenth Day of June, 2008

JON W. DUDAS
*Director of the United States Patent and Trademark Office*